United States Patent
Song et al.

(10) Patent No.: US 10,200,528 B2
(45) Date of Patent: *Feb. 5, 2019

(54) METHOD FOR PERFORMING FUNCTION AND ELECTRONIC DEVICE SUPPORTING THE SAME

(71) Applicant: Samsung Electronics Co., Ltd., Gyeonggi-do (KR)

(72) Inventors: Hyun Jung Song, Gyeonggi-do (KR); Wan Soo Lim, Gyeonggi-do (KR); Seung Min Choi, Gyeonggi-do (KR); Ji Hyun Choi, Seoul (KR); Kyoung Taek Kim, Gyeonggi-do (KR); Jun Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,775

(22) Filed: Jan. 8, 2018

(65) Prior Publication Data

US 2018/0131804 A1    May 10, 2018

Related U.S. Application Data

(63) Continuation of application No. 15/054,896, filed on Feb. 26, 2016, now Pat. No. 9,866,674.

(30) Foreign Application Priority Data

Feb. 27, 2015 (KR) .......................... 10-2015-0028532

(51) Int. Cl.
*H04M 3/00* (2006.01)
*H04M 1/725* (2006.01)
(Continued)

(52) U.S. Cl.
CPC ......... *H04M 1/72569* (2013.01); *H04M 1/22* (2013.01); *H04M 9/082* (2013.01);
(Continued)

(58) Field of Classification Search
CPC ......... H04M 1/72519; H04M 1/72525; H04M 1/72522; H04M 1/72583; H04M 19/04;
(Continued)

(56) References Cited

U.S. PATENT DOCUMENTS 5,946,636 A    8/1999    Uyeno et al.
6,690,955 B1   2/2004    Komiyama
(Continued)

FOREIGN PATENT DOCUMENTS

EP    1 324 578    7/2003
EP    2 469 806    6/2012
(Continued)

OTHER PUBLICATIONS

International Search Report dated Jun. 8, 2016 issued in counterpart application No. PCT/KR2016/001955, 12 pages.
(Continued)

*Primary Examiner* — Danh C Le
(74) *Attorney, Agent, or Firm* — The Farrell Law Firm, P.C.

(57) ABSTRACT

An electronic device and a method for performing a function in the electronic device are provided. The method includes recognizing that the electronic device is at a first state, the first state including that the electronic device is in an overturned state or that a predetermined amount of a display is covered; detecting a specific event in the first state; outputting a color notification associated with the detected specific event through at least a portion of the display, the portion of the display wrapping around a side edge of the electronic device; receiving a specific user input correspond-
(Continued)

ing to the color notification, while outputting the color notification; and performing a function associated with the received specific user input.

20 Claims, 10 Drawing Sheets

(51) Int. Cl.
*H04M 1/22* (2006.01)
*H04M 19/04* (2006.01)
*H04M 9/08* (2006.01)
*H04W 88/02* (2009.01)

(52) U.S. Cl.
CPC ...... *H04M 19/048* (2013.01); *H04M 1/72519* (2013.01); *H04M 1/72522* (2013.01); *H04W 88/02* (2013.01)

(58) Field of Classification Search
CPC ..... H04M 19/041; H04W 88/02; G06F 9/254; G06F 9/544; G06F 9/45533; G06F 11/0778
USPC ............ 455/418, 574, 566; 719/318; 714/37
See application file for complete search history.

(56) References Cited

U.S. PATENT DOCUMENTS

| | | | |
|---|---|---|---|
| 7,151,953 B2 | 12/2006 | Hamada et al. | |
| 7,698,727 B2 | 4/2010 | Kikinis et al. | |
| 7,886,330 B2 | 2/2011 | Kikinis | |
| 8,649,828 B1* | 2/2014 | Sanjeev | H04W 52/0254 455/574 |
| 8,723,824 B2 | 5/2014 | Myers et al. | |
| 8,756,635 B2 | 6/2014 | Kikinis | |
| 8,976,141 B2 | 3/2015 | Myers et al. | |
| 9,002,326 B2 | 4/2015 | Santo et al. | |
| 9,075,568 B1* | 7/2015 | Gray | G06F 1/1626 |
| D745,004 S | 12/2015 | Kim | |
| 9,300,772 B2 | 3/2016 | Kim | |
| 9,411,451 B2 | 8/2016 | Myers et al. | |
| 9,438,709 B2 | 9/2016 | Kim | |
| D770,504 S | 11/2016 | Kim et al. | |
| 9,491,272 B2 | 11/2016 | Kim | |
| D775,124 S | 12/2016 | Kim | |
| D775,625 S | 1/2017 | Kim | |
| 9,602,644 B2 | 3/2017 | Kim | |
| 9,791,949 B2 | 10/2017 | Myers et al. | |
| 2002/0019980 A1 | 2/2002 | Kikinis | |
| 2002/0019986 A1 | 2/2002 | Kikinis | |
| 2002/0059597 A1 | 5/2002 | Kikinis et al. | |
| 2002/0198029 A1* | 12/2002 | Tenhunen | G09G 3/20 455/566 |
| 2003/0147113 A1 | 8/2003 | Hamada et al. | |
| 2003/0172380 A1 | 9/2003 | Kikinis | |
| 2010/0175087 A1 | 7/2010 | Kikinis et al. | |
| 2010/0269072 A1* | 10/2010 | Sakata | G06F 1/1601 715/863 |
| 2011/0158611 A1 | 6/2011 | Kikinis | |
| 2011/0255353 A1* | 10/2011 | Fukushima | G01R 31/2874 365/191 |
| 2012/0218191 A1* | 8/2012 | Huang | G06F 1/1643 345/173 |
| 2012/0289203 A1 | 11/2012 | Santo et al. | |
| 2012/0293605 A1* | 11/2012 | Seferian | H04N 7/147 348/14.08 |
| 2013/0076649 A1 | 3/2013 | Myers et al. | |
| 2013/0100017 A1 | 4/2013 | Papakipos et al. | |
| 2013/0178152 A1* | 7/2013 | Matoba | H04M 1/7253 455/39 |
| 2013/0178248 A1 | 7/2013 | Kim | |
| 2013/0290986 A1* | 10/2013 | Kobayashi | G06F 3/01 719/318 |
| 2013/0300697 A1 | 11/2013 | Kim et al. | |
| 2014/0012511 A1* | 1/2014 | Mensinger | A61B 5/72 702/19 |
| 2014/0240289 A1 | 8/2014 | Myers et al. | |
| 2014/0351744 A1 | 11/2014 | Jeon et al. | |
| 2014/0370938 A1 | 12/2014 | Lee et al. | |
| 2015/0022469 A1 | 1/2015 | Mhun et al. | |
| 2015/0130767 A1 | 5/2015 | Myers et al. | |
| 2015/0227227 A1 | 8/2015 | Myers et al. | |
| 2015/0242006 A1 | 8/2015 | Kim et al. | |
| 2015/0249729 A1 | 9/2015 | Kim | |
| 2015/0262194 A1* | 9/2015 | Dunlop | G06Q 30/06 705/318 |
| 2016/0014246 A1 | 1/2016 | Kim | |
| 2016/0014719 A1 | 1/2016 | Kim | |
| 2016/0139974 A1* | 5/2016 | Herb | G06F 11/079 714/37 |
| 2016/0253969 A1* | 9/2016 | Chen | G02F 1/133 345/214 |
| 2016/0294995 A1 | 10/2016 | Kim | |
| 2016/0373565 A1 | 12/2016 | Kim | |
| 2018/0052540 A1 | 2/2018 | Myers et al. | |
| 2018/0267642 A1 | 9/2018 | Kim et al. | |

FOREIGN PATENT DOCUMENTS

| | | |
|---|---|---|
| KR | 10-2015-0035901 | 4/2015 |
| WO | WO 2012/126076 | 9/2012 |

OTHER PUBLICATIONS

European Search Report dated Jun. 29, 2016 issued in counterpart application No. 16157585.7-1972, 7 pages.
European Search Report dated Mar. 15, 2018 issued in counterpart application No. 16157585.7-1216, 4 pages.
European Search Report dated Oct. 23, 2018 issued in counterpart application No. 16157585.7-1216, 46 pages.

* cited by examiner

METHOD FOR PERFORMING FUNCTION AND ELECTRONIC DEVICE SUPPORTING THE SAME

PRIORITY

This application is a Continuation of U.S. Ser. No. 15/054,896, which was filed in in the U.S. Patent and Trademark Office on Feb. 26, 2016, and claims priority under 35 U.S.C. § 119(a) to Korean Patent Application Serial No. 10-2015-0028532, which was filed in the Korean Intellectual Property Office on Feb. 27, 2015, the entire disclosure of which is incorporated herein by reference.

BACKGROUND

1. Field of the Disclosure

The present disclosure relates generally to an electronic device and a method for notifying a user of an event occurrence through a display in the electronic device and for performing a corresponding function.

2. Description of the Related Art

An electronic device, such as a smart phone or a tablet personal computer (PC), performs various functions, such as a call connection, a message reception, a schedule notification, etc. The electronic device notifies a user of events, which occur in various applications, through sounds, pop-up windows, or screen notifications. From the notification, the user identifies a type and/or content of the event through the display and performs an associated function (e.g., a call connection, a message transmission, etc.) through a touch screen input or a button input.

Conventionally, when an event, such as a message reception, a schedule notification, etc., occurs in the electronic device, a corresponding notification is output through a display, e.g., a notification message is displayed on the display. The user sees the notification through the display and performs a function in response thereto (e.g., a message confirmation, a schedule confirmation, etc.). While the user may perform the function after seeing the indication on the screen, it is often inconvenient for the user to perform the function when the user is not able to see the screen or it is difficult to see the screen.

SUMMARY

The present disclosure is provided to address at least the above-described problems and/or disadvantages, and to provide at least the advantages described below.

Accordingly, an aspect of the present disclosure is to provide an electronic device and a method for notifying a user of an event occurrence through a display in an electronic device and for performing a function related to event occurrence.

In accordance with an aspect of the present disclosure, a method is provided for performing a function in an electronic device including a display. The method includes recognizing that the electronic device is at a first state, the first state including that the electronic device is in an overturned state or that a predetermined amount of the display is covered; detecting a specific event in the first state; outputting a color notification associated with the detected specific event through at least a portion of the display, the portion of the display wrapping around a side edge of the electronic device; receiving a specific user input corresponding to the color notification, while outputting the color notification; and performing a function associated with the received specific user input.

In accordance with an aspect of the present disclosure, an electronic device is provided, which includes a display; and a processor configured to detect that the electronic device is in a first state, the first state including that the electronic device is in an overturned state or that a predetermined amount of the display is covered, detect an event in the first state, output a color notification associated with the detected event through a portion of the display that wraps around a side edge of the electronic device, receive a user input corresponding to the color notification, while outputting the color notification, and perform a function associated with the received user input.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
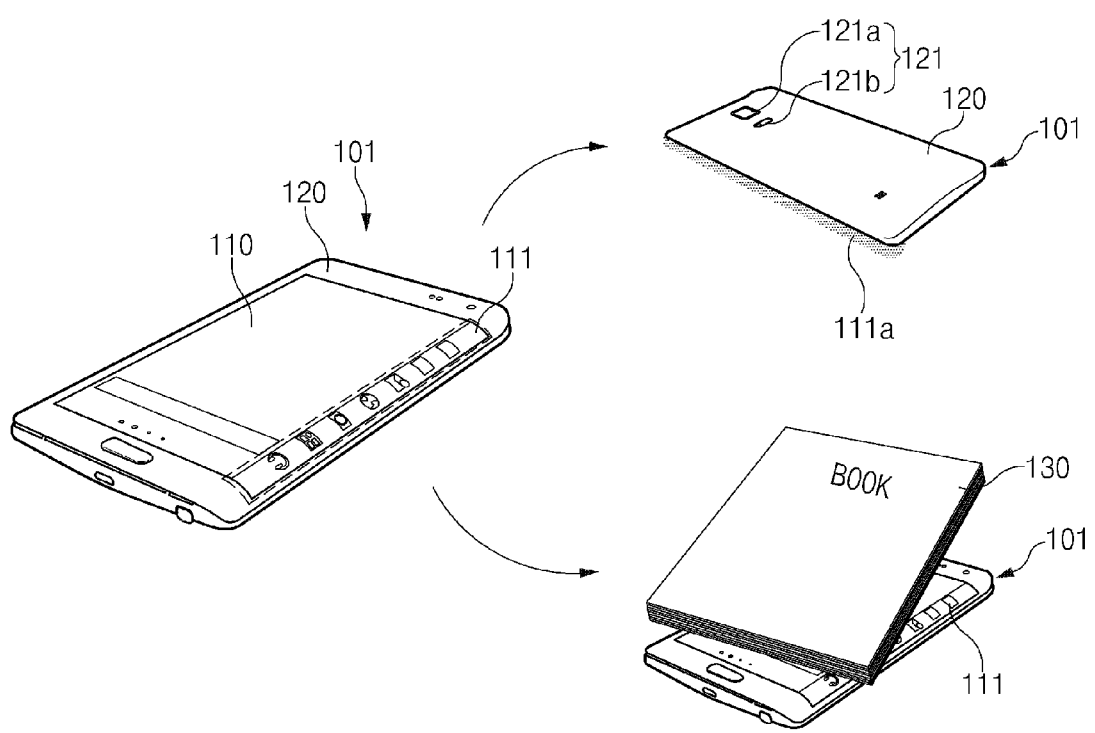
FIG. 1 illustrates an electronic device according to an embodiment of the present disclosure.

Various embodiments of the present disclosure are described below with reference to accompanying drawings. Accordingly, those of ordinary skill in the art will recognize that modifications, equivalents, and/or alternatives of the various embodiments described herein may be made without departing from the scope and spirit of the present disclosure.

With regard to description of drawings, similar components may be marked by similar reference numerals.

Terms and expressions used in this specification are used to describe certain embodiments of the present disclosure and are not intended to limit the scope of the present disclosure.

The terms of a singular form may include plural forms unless otherwise specified.

Unless otherwise defined herein, all the terms, which include technical or scientific terms, may have the same meaning that is generally understood by a person skilled in the art. Further, terms that are defined in a dictionary and commonly used, should also be interpreted as is customary in the relevant related art and not in idealized or overly formal ways, unless expressly so defined herein. In some cases, even if terms are defined in the specification, they are not to be interpreted to exclude other embodiments of the present disclosure.

Herein, the expressions "have", "may have", "include", "comprise", "may include", and "may comprise" indicate the existence of corresponding features (e.g., elements such as numeric values, functions, operations, or components), but do not exclude presence of additional features.

The expressions "A or B", "at least one of A or/and B", or "one or more of A or/and B", etc., may include any and all combinations of one or more of the associated listed items. For example, the terms "A or B", "at least one of A and B", or "at least one of A or B" may refer to (1) where at least one A is included, (2) where at least one B is included, or (3) where both of at least one A and at least one B are included.

The terms, such as "first", "second", etc., may refer to various elements of various embodiments of the present disclosure, but do not limit the elements. For example, such terms do not limit the order and/or priority of the elements. Further, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, no intervening elements may be present therebetween.

According to context, the expression "configured to" may be used interchangeably with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may indicate a dedicated processor (e.g., an embedded processor) for performing a corresponding operation or a generic-purpose processor (e.g., a central processing unit (CPU) or an application processor) that may perform corresponding operations by executing one or more software programs that are stored in a memory device.

Herein, the term "user" may refer to a person who uses an electronic device or may refer to a device (e.g., an artificial intelligence electronic device) that uses an electronic device.

FIG. 1 illustrates an electronic device according to an embodiment of the present disclosure.

Referring to FIG. 1, an electronic device 101 includes a display 110 and a body 120.

The display 110 may be implemented, for example, with a liquid crystal display (LCD), a light emitting diode (LED) display, etc. Various content (e.g., a text, an image, a video, an icon, a symbol, etc.) may be displayed on the display 110. The display 110 may include a touch screen that receives touch, gesture, proximity, and/or hovering inputs using an electronic pen or a portion of a user's body.

The display 110 includes a notification area 111. When a specific event occurs in the electronic device 101, the notification area 111 may output a color corresponding to the event. For example, when an incoming call event occurs, the electronic device 101 may output a yellow color, which may be set in advance to correspond to the incoming call event, in the notification area 111. Similarly, when a message reception event occurs, a green color may be output through the notification area 111, or when a schedule notification event occurs, a red color may be output through the notification area 111.

Although FIG. 1, illustrates the notification area 111 being disposed at the right edge area of the display 110, the present disclosure is not be limited thereto. For example, the notification area 111 may be disposed at a left edge, top edge, or bottom edge of the display 110.

Although FIG. 1 also illustrates the display 110 extending in a lateral direction of the electronic device 101 at a specific angle (e.g., at an angle of 45 degrees in the downward direction relative to the surface of the display 110), the present disclosure is not be limited thereto. For example, the notification area 111 may be applied to a display extending to the side at an angle of 90 degrees in the downward direction relative to the surface of the display or may be applied to a display extending in a circle or an oval shape.

The notification area 111 may include a sub-display area that is distinguished from a main display area of the electronic device 101. In this case, the notification area 111 may be an area that complements the main display area and provides information in a simple form.

The notification area 111 may be implemented with a separate display panel that is distinguished from a display panel by which the main display area is defined.

The notification area 111 may be disposed at a different surface (e.g., a side or rear of the electronic device 101) than the main display area.

When the electronic device 101 is at an overturned and stationary state, e.g., laying to display side down on a table, and user cannot the display 110, the electronic device 101 may output an event occurrence notification through the notification area 111. Based on the type of event, the electronic device 101 may output different colors through the notification area 111 or may output the same or different colors using different output methods.

Similarly, when the display 110 is covered by an external object 130 (e.g., a book, a piece of paper, etc.) or an accessory device (e.g., a cover case), the electronic device 101 may also still output the event occurrence notification through the notification area 111.

For example, when the electronic device 101 recognizes the display 110 as being covered with the external object 130, and there is an incoming call, the electronic device 101 may output a specific color corresponding to an incoming call notification through the notification area 111. Even though the display 110 is covered, the user may still recognize the type of the event based on the color of the light output through the notification area 111 (or a color of a light 111a, which is reflected around, when the display 110 is face down on a surface).

When a separate motion occurs while the electronic device 101 overturned, the electronic device 101 may output an event notification through the display 110, not the notification area 111. For example, when the user lies down on his back and is holding the electronic device 101 over his face, although the electronic device 101 may recognize the display 110 as facing down, because the electronic device 101 may also recognize that the electronic device 101 is being gripped by the user (i.e., a separate motion), the electronic device 101 may output the event notification through the display 110, not the notification area 111. For example, the electronic device 101 may determine a state of the device using various sensor modules, such as a grip sensor, an acceleration sensor, a geomagnetic sensor, etc.

The body 120 includes a module 121 (e.g., a camera module 121*a*, a sensor module 121*b*, etc.) and/or various buttons (e.g., a home button, a power button, a volume button, a rear button, etc.). Further, the body 120 may include a processor that receives an input from the various module and/or buttons and performs corresponding operations.

When a specific user input is received while outputting a color associated with an event notification through the notification area 111, the processor may perform a function corresponding to the user input. The user input may include an input received through the camera 121*a* included in the body 120, an input recognized through the sensor module 121*b* (e.g., a heart rate monitor (HRM) sensor, a fingerprint sensor, a pressure sensor, an illuminance sensor, a motion sensor, etc.), a button input, etc.

For example, when a message is received while the electronic device 101 overturned, i.e., when the display 110 is facedown, the processor may output a yellow light through the notification area 111. During the output of the yellow light, when a user input is received through the sensor module 121*b*, e.g., a HRM sensor, disposed in the rear surface of the electronic device 101, the processor may send a message (e.g., 'now in a meeting') that is set in advance to a the message sender.

As described above, in accordance with an embodiment of the present disclosure, when the electronic device 101 is overturned or the display 110 thereof is covered, the user may still recognize a type of a notification event by seeing only the notification area 111, and not directly seeing the display 110. Further, the user may perform a function, such as a message transmission, a call rejection, etc., with a simple input.

Below, an embodiment of the present disclosure is described.

Figure 2:
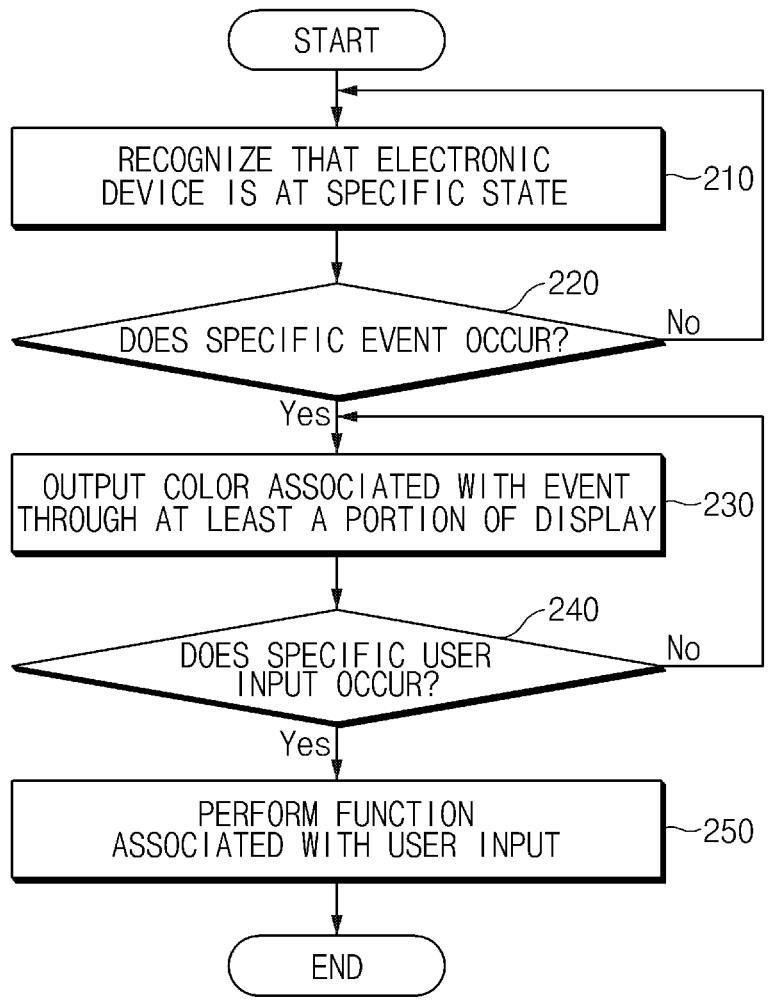
FIG. 2 is a flow chart illustrating a method for performing a function, according to an embodiment of the present disclosure.

FIG. 2 is a flow chart illustrating a method for performing a function, according to an embodiment of the present disclosure. Although the method of FIG. 2 is described with the electronic device 101 being in an overturned and stationary state, the method of FIG. 2 is not limited thereto. For example, the method of FIG. 2 may be applied when the display 110 is covered with the external object 130, as illustrated in FIG. 1.

Referring to FIG. 2, in step 210, an electronic device, e.g., a processor therein, recognizes that the electronic device is at a specific state, i.e., that the electronic device is overturned and stationary.

In step 220, the electronic device determines whether a specific event occurs. For example, the specific event may be an event set in advance to output a color through a notification area, such as an incoming call event, a message reception event, a schedule notification event, etc. The color associated with the event may be assigned by default or may be set by the user.

The electronic device may provide a separate user interface (UI) for setting a notification color setting for a specific event or may include a color notification setting as a setting item of a specific application. For example, in an address book application, an address book editing item may be provided for setting a color for each person or groups of people in the address book.

In step 230, when the specific event occurs, the electronic device outputs a color associated with the event through the notification area.

Based on a type of application, the electronic device may change the color to be output or a method for outputting a color, and may provide a notification based on the changed result. For example, when a message is received, the electronic device may output a green notification through the notification area, or when a schedule event notification occurs, the electronic device may output a red notification through the notification area.

Based on a type of event that occurs in an application, the electronic device may change the color and/or a method for outputting the color, and may provide a notification based on the changed result. For example, in a call application, a yellow notification may be output when a call is received from a person belonging to a first group_included in an address book, and a green notification may be output when a call is received from a person belonging to a second group included in the address book.

In step 240, the electronic device determines whether a specific user input for performing a function associated with the event notification is received. For example, the specific user input may include an input recognized through various sensors included in the electronic device, an input received through a camera, a button input, etc., or an input received through the notification area.

In step 250, if the specific user input for performing the function associated with the event notification is received, the electronic device performs the function associated with the user input. For example, if the user operates an HRM sensor during the output of a color notification associated with a call reception, the electronic device may send a specific message to a caller (e.g., 'In a meeting now.'). If the function is performed, the electronic device may stop outputting the color notification through the notification area.

Figure 3:
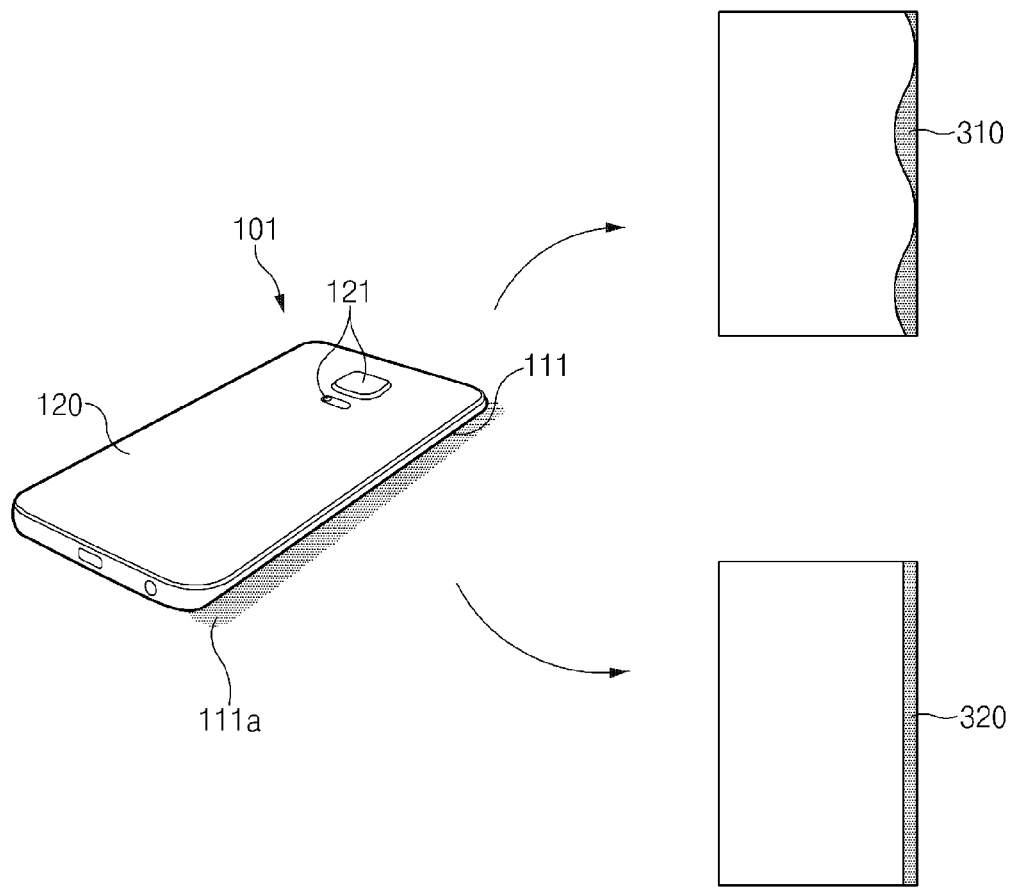
FIG. 3 illustrates an example of changing an output method of a notification area according to an embodiment of the present disclosure.

FIG. 3 illustrates an example of changing an output method of a notification area according to an embodiment of the present disclosure.

Referring to FIG. 3, when a specific event (e.g., an incoming call event, a message reception event, a schedule notification event, etc.) occurs, a color notification corresponding to the event is output through the notification area 111. For example, when a message is received, a green notification may be output through the notification area 111, or when a schedule event notification occurs, a red notification may be output through the notification area 111.

Even though the same color is output through notification area 111, the electronic device 101 may change the output method such that a user can identify a type of the event.

For example, when a yellow notification is set for an incoming call event, although the electronic device 101 will display the yellow notification for all incoming calls, the electronic device 101 may output a wave shape 310 for an incoming call from a person belonging to a first group included in an address book and may output a rectangular shape 320 with respect to an incoming call about a person belonging to a second group included in the address book.

As another example, when a user sets a yellow notification with respect to person A included in an address book and a green notification with respect to person B included in the address book, the electronic device 101 may output the yellow notification in the form of the wave shape 310 with respect to A's incoming call event and may output the yellow notification in the form of the rectangular shape 320 with respect to A's message reception event. Similarly, the electronic device 101 may output the green notification in the form of the wave shape 310 with respect to B's incoming call event and may output the green to notification in the form of the rectangular shape 320 with respect to B's message reception event.

Figure 4:
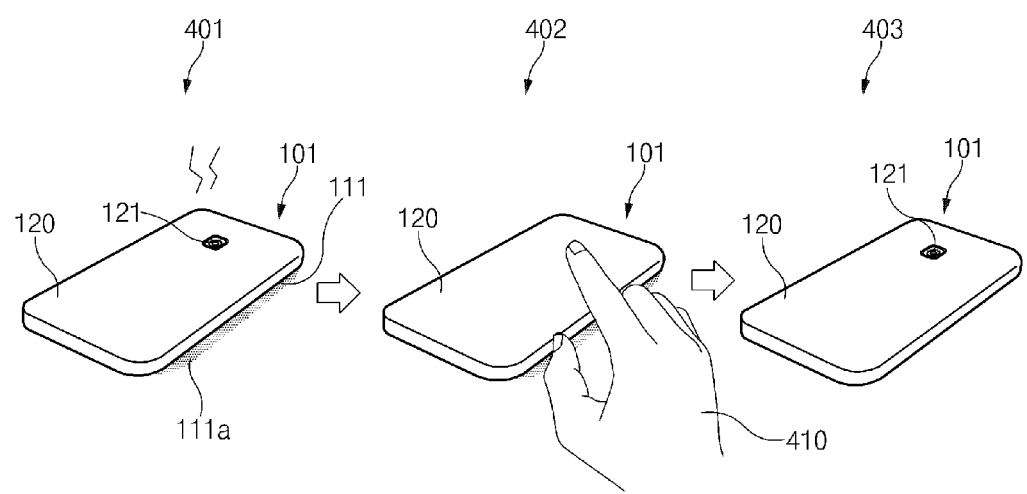
FIG. 4 illustrates a procedure for performing a function, according to an embodiment of the present disclosure.

FIG. 4 illustrates a procedure for performing a function, according to an embodiment of the present disclosure.

Referring to FIG. 4, in state 401, when a specific event (e.g., an incoming call event, a message reception event, a schedule notification event, etc.) occurs, the electronic device 101 outputs a color notification set in advance through the notification area 111. Even though the notification area 111 is pointed toward the surface that the electronic device 101 rests on in state 401, a user may still see the notification area 111 or the light 111*a* which is reflected off of the surface, thereby being able to recognize information about the event.

Accordingly, the user may recognize a type of event without directly seeing the display 110 and may handle the current event. For example, even though the user is in the middle of another task (e.g., in a meeting, in class, etc.), the user may identify a type of event, without turning the electronic device 101 over.

In state 402, in response to seeing the notification area 111 or the reflected light 111*a,* and the user may rapidly perform a function by providing a specific input to the electronic device 101. For example, in FIG. 4, where the sensor or the camera module 121 is disposed at the rear surface of the electronic device 101, the user may touch the sensor or the camera module with a forger to perform a function corresponding to the type of event set in advance, e.g., a message transmission, a call rejection, etc.

In state 403, after receiving the user input, the electronic device 101 may perform a function associated with the user input, without the user having to turn the electronic device 101 over. For example, for an incoming call event notification, a function to send a call rejection or a specific message (e.g., 'In a meeting now.') may be performed in response to the user input. Thereafter, the electronic device 101 may stop outputting the color notification from the notification area 111.

Figure 5:
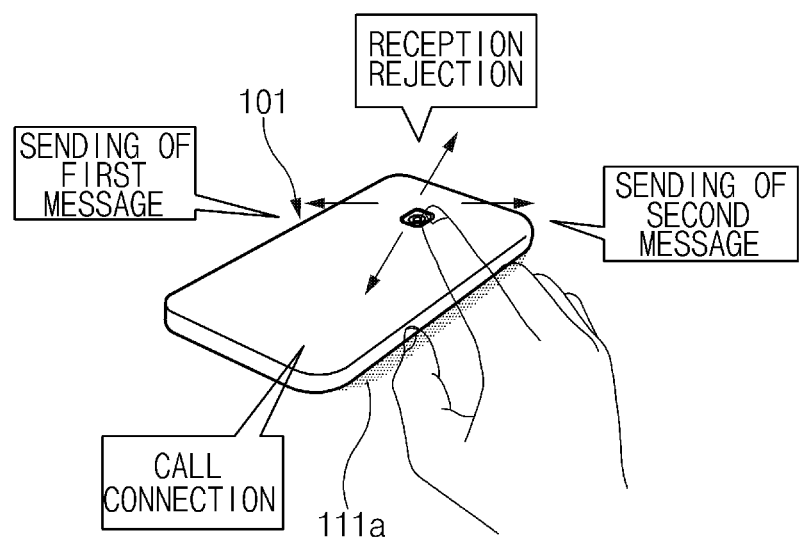
FIG. 5 illustrates a function performed based on a change of a user input, according to an embodiment of the present disclosure.

FIG. 5 illustrates a function performed based on a change of a user input, according to an embodiment of the present disclosure.

Referring to FIG. 5, when a specific event (e.g., an incoming call event, a message reception event, a schedule notification event, etc.) occurs, the electronic device 101 outputs a color notification set in advance through the notification area 111. As described above, even though the electronic device 101 is facedown, the user may recognize the occurrence of the event through the notification area 111 or the reflected light 111*a,* and then may perform an associated function through a specific user input.

The electronic device 101 may perform different associated functions based on a state (or a type) of the user input (e.g., a touch direction, a touch duration, a motion direction, a tilt change of the electronic device 101, etc.).

For example, when the user input is received through a camera module or an HRM sensor, the electronic device 101 may be set to send different messages or to perform different functions, based on a direction of the user input.

As illustrated in FIG. 5, when the user moves a touch to the upward direction of the electronic device 101, the electronic device 101 may send a call rejection message. When the user moves a touch to the downward direction of the electronic device 101, the electronic device 101 may make a call connection, e.g., through a speaker phone. Further, when a user moves a touch to the left direction, the electronic device 101 may send a first message (e.g., 'In a meeting now.'), and when the user moves a touch to the right direction, the electronic device 101 may send a second message (e.g., 'Call you back soon.').

While FIG. 5 illustrates examples of the types of inputs and operations that may be performed in response thereto, the present disclosure is not be limited thereto. Different types of inputs and operations may be performed in response to the color notifications. For example, when the user sets different message content to different touch directions, respectively, the electronic device 101 may send a message corresponding to a direction to which the touch moves.

Figure 6:
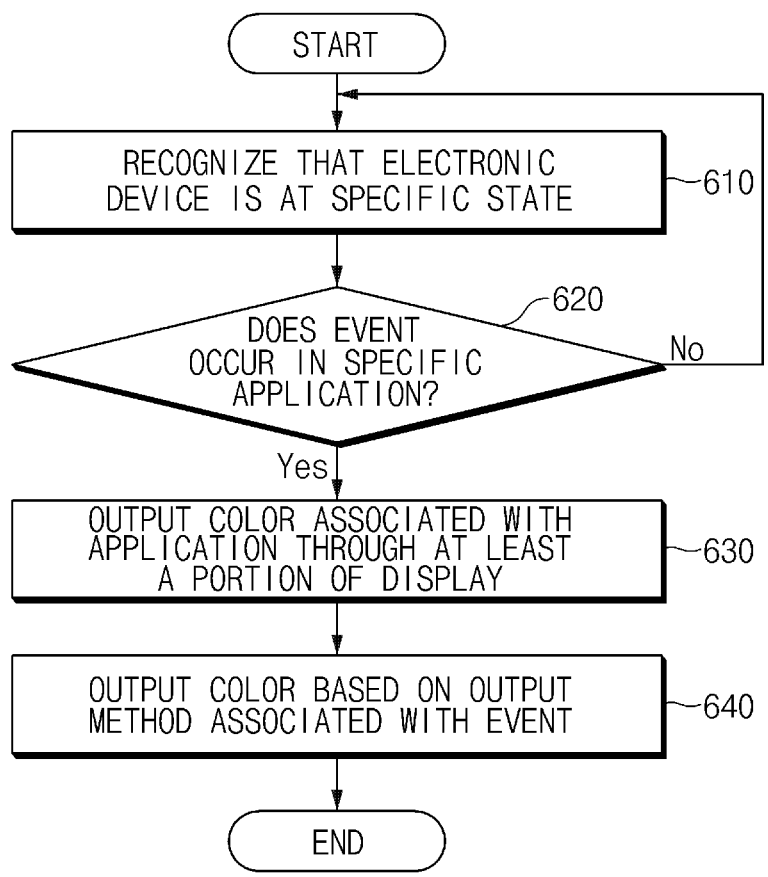
FIG. 6 is a flow chart illustrating a method for operating a notification area based on an application, according to an embodiment of the present disclosure.

FIG. 6 is a flow chart illustrating a method for operating a notification area based on an application, according to an embodiment of the present disclosure.

Referring to FIG. 6, in step 610, an electronic device, e.g., a processor therein, recognizes that the electronic device is in a specific state. For example, the specific state may be that the electronic device is overturned and stationary so that a display thereof is facedown, or that the display is covered in excess of a specific range.

In step 620, the electronic device determines whether an event occurs in a specific application. For example, when a user sets color notifications to output through a notification area for a call application, a message application, and a schedule application, the electronic device may detect whether an event occurs in the call application, the message application, and the schedule application. If an event occurs for an application to which the user has not set a color notification, , the electronic device may provide a notification that the event has occurred through the display, not the notification area.

In step 630, when an event occurs in a specific application, the electronic device outputs a color notification associated with the application through the notification area. For example, when an event notification associated with a call application is yellow, associated with a message application is green, and associated with a schedule application is red, the electronic device outputs the color associated with the application corresponding to the event, through the notification area.

In step 640, when an output method is associated with a type of event is set, the electronic device outputs a color notification based on the output method. For example, in a call application, which is with a yellow notification, the yellow notification may be output in a wave shape when there is a call from person A, the yellow color may be output in a rectangular shape when there is a call from person B, and the yellow color may be outputted in a form of sparkling when there is a call from person C. The operation method may be differently set by a user, and an operation method may be set differently for each group included in an address book. The electronic device 101 may determine an operation method of the notification area based on a user setting or a default setting.

Figure 7:
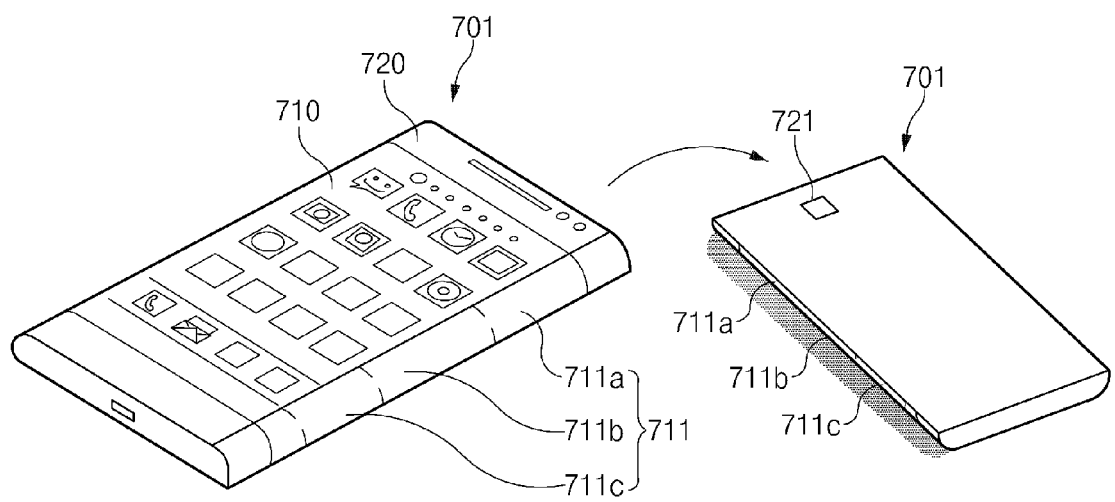
FIG. 7 illustrates an electronic device including a side display, according to an embodiment of the present disclosure.

FIG. 7 illustrates an electronic device including a side display, according to an embodiment of the present disclosure.

Referring to FIG. 7, an electronic device 701 includes a display 710 and a body 720.

The display 710 extends to the side of the electronic device 701. The display 710 includes a notification area 711 in the side area of the electronic device 701. The notification area 711 includes first to third sections 711a to 711c.

While FIG. 7 illustrates the notification area 711 having the three sections 711a to 711c, the present disclosure is not limited thereto. For example, the notification area 711 may be divided into two sections or four or more sections.

Based on a type of event generated in the electronic device 701 and a type of application associated with the generated event, the first to third sections 711a to 711c may output different colors or may operate in accordance with a specific time sequence. For example, when an event associated with a call application occurs, the first section 711a may be used for the notification thereof, and when an event associated with a message application occurs, the second section 711b may be used for the notification thereof.

For example, when a green notification is assigned to a person A included in an address book, the electronic device 701 outputs the green notification through the first section 711a, when an incoming call is received from person A, and outputs the green notification through the second section 711b, when person A sends a message.

As described above, without directly seeing the display 710, e.g., when the display 710 is covered or lying face-down, the user may still identify a color notification and a location of a section at which the color notification is output. Accordingly, the use can identify information about the event.

In response, the user may touch e.g., a camera module or a sensor (e.g., the HRM sensor) 721 disposed at the rear surface of the electronic device 701, e.g., to send a present message or a call rejection message to person A.

Figure 8:
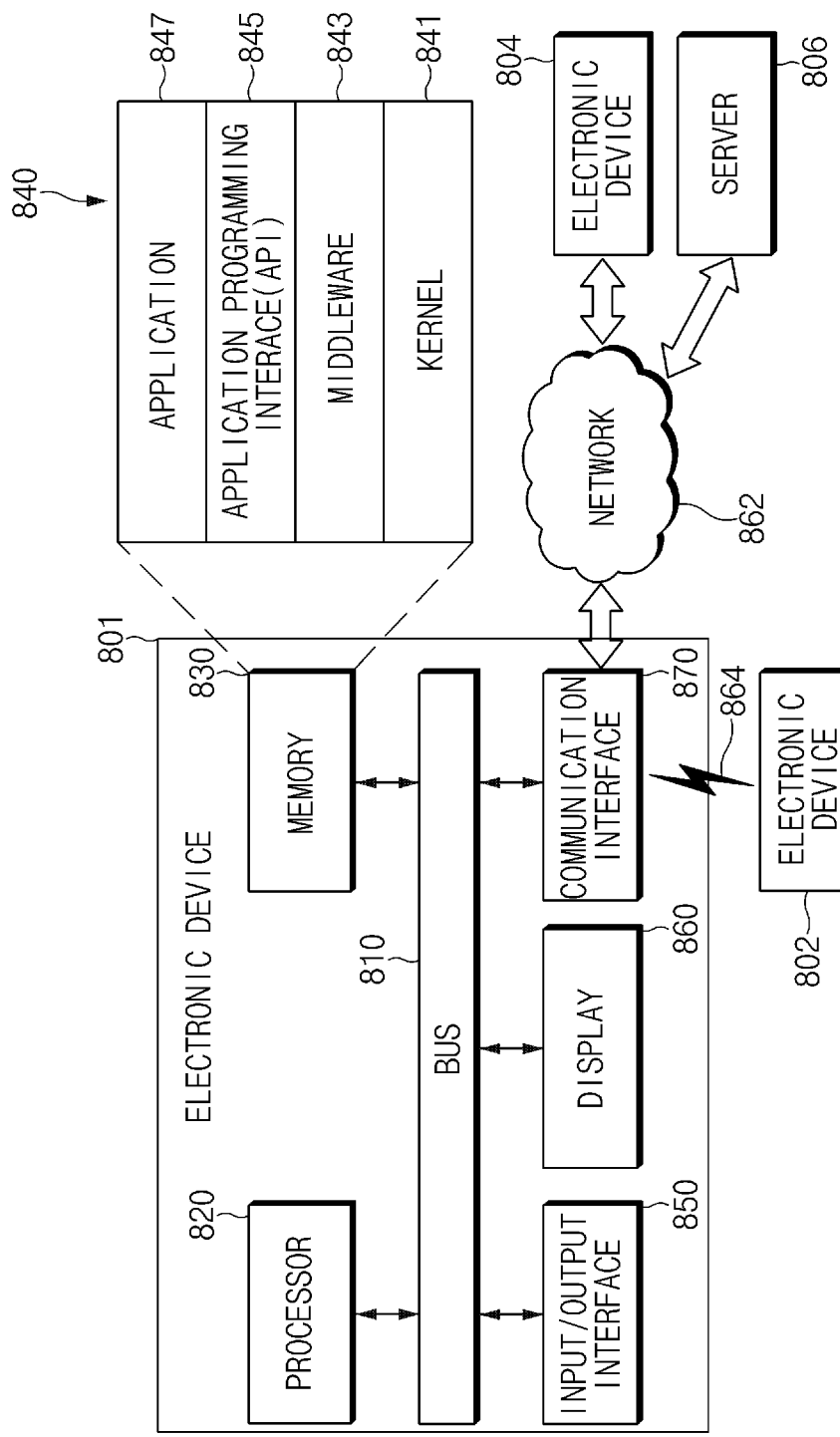
FIG. 8 illustrates an electronic device in a network environment, according to an embodiment of the present disclosure.

FIG. 8 illustrates an electronic device in a network environment, according to an embodiment of the present disclosure.

Referring to FIG. 8, an electronic device 801 includes a bus 810, a processor 820, a memory 830, an input/output (I/O) interface 850, a display 860, and a communication interface 870. Alternatively, the electronic device 801 may omit at least one of the above-described components or may further include other component(s).

The bus 810 may interconnect the above-described components 820 to 870 and may be a circuit for conveying communications (e.g., a control message and/or data) among the above-described components.

The processor 820 may include one or more of a central processing unit (CPU), an application processor (AP), or a communication processor (CP). The processor 820 may perform data processing or an operation associated with control or communication of at least one other component(s) of the electronic device 801.

The memory 830 may include a volatile and/or nonvolatile memory. The memory 830 may store instructions or data associated with at least one other component(s) of the electronic device 801. The memory 830 stores software and/or a program 840. The program 840 includes a kernel 841, a middleware 843, an application programming interface (API) 845, and an application 847. At least a portion of the kernel 841, the middleware 843, or the API 845 may be referred to as an "operating system (OS)".

The kernel 841 may control or manage system resources (e.g., the bus 810, the processor 820, the memory 830, etc.) that are used to execute operations or functions of other programs (e.g., the middleware 843, the API 845, and the application 847). Further, the kernel 841 may provide an interface that allows the middleware 843, the API 845, or the application 847 to access discrete components of the electronic device 801 so as to control or manage system resources.

The middleware 843 may act as an interface for the API 845 or the application 847 to communicate with the kernel 841, e.g., in order to exchange data.

Further, the middleware 843 may process task requests received from the application 847 according to a priority. For example, the middleware 843 may assign the priority, which makes it possible to use a system resource (e.g., the bus 810, the processor 820, the memory 830, etc.) of the electronic device 801, to the application 847. For example, the middleware 843 may process the one or more task requests according to the priority assigned to the application 847, which makes it possible to perform scheduling or load balancing on the one or more task requests.

The API 845 may be an interface through which the application 847 controls a function provided by the kernel 841 or the middleware 843, and may include at least one interface or function (e.g., an instruction) for a file control, a window control, image processing, a character control, etc.

The I/O interface 850 may transmit an instruction or data, input from a user or another external device, to other component(s) of the electronic device 801. Further, the I/O interface 850 may output an instruction or data, received from other component(s) of the electronic device 801, to a user or another external device.

The display 860 may include a liquid crystal display (LCD), a light-emitting diode (LED) display, an organic LED (OLED) display, a microelectromechanical systems (MEMS) display, or an electronic paper display. The display 860 may display various content (e.g., a text, an image, a video, an icon, a symbol, etc.). The display 860 may include a touch screen and may receive a touch, gesture, proximity, or hovering input using an electronic pen or a portion of a user's body.

The communication interface 870 may establish communication between the electronic device 801 and a first external electronic device 802, a second external electronic device 804, or a server 806. For example, the communication interface 870 may be connected to a network 862 through wireless communication or wired communication to communicate with the second external electronic device 804 or the server 806.

The wireless communication may include at least one of a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol.

Further, the wireless communication may include a local area network 864. The local area network 864 may utilize at least one of a wireless fidelity (Wi-Fi), a Bluetooth, a near field communication (NFC), a global navigation satellite system (GNSS), etc. The GNSS may include at least one of a global positioning system (GPS), a global navigation satellite system (Glonass), a BeiDou navigation satellite system, or a European global satellite-based navigation system based on an available region, a bandwidth, etc.

For example, the wired communication may include at least one of a universal serial bus (USB), a high definition multimedia interface (HDMI), a recommended standard-232 (RS-232), a plain old telephone service (POTS), etc. For example, the network 862 may include at least one of telecommunications networks, a computer network (e.g., local area network (LAN) or wide area network (WAN)), an internet, or a telephone network.

Each of the first and second external electronic devices 802 and 804 may be a device of which the type is different from or the same as that of the electronic device 801. The server 806 may include a group of one or more servers.

All or a part of operations that the electronic device 801 performs may be executed by another or a plural electronic devices (e.g., the electronic devices 802 and 804 and the server 806).

When the electronic device 801 executes any function or service automatically or in response to a request, the electronic device 801 may instead request at least a portion of a function associated with the electronic device 801 to be executed by the electronic device 802 or 804 or the server 806. The electronic device 802 or 804 or the server 806 may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

Figure 9:
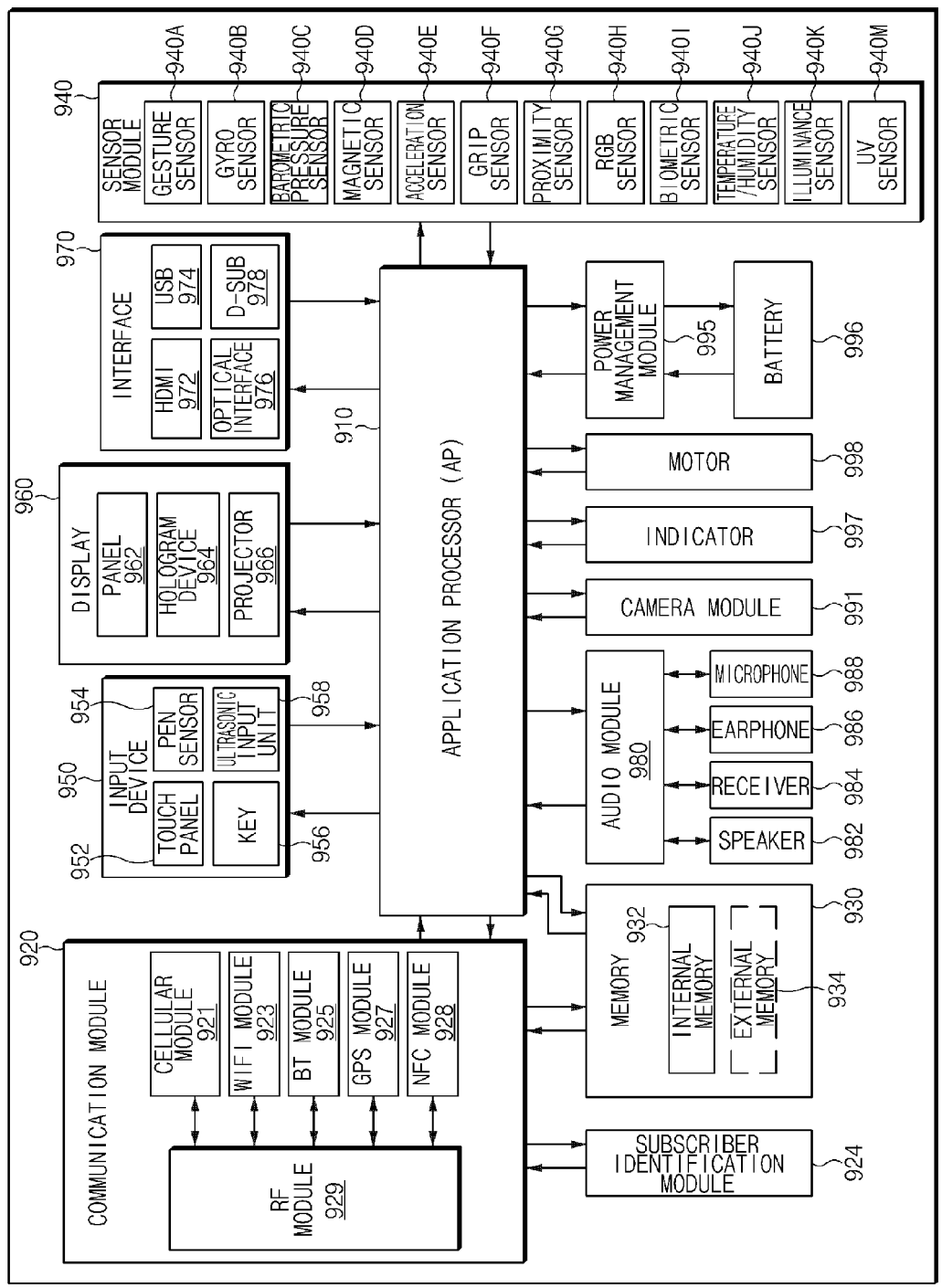
FIG. 9 illustrates an electronic device according to an embodiment of the present disclosure.

FIG. 9 illustrates an electronic device according to an embodiment of the present disclosure.

Referring to FIG. 9, the electronic device includes an AP 910, a communication module 920, a subscriber identification module 924, a memory 930, a sensor module 940, an input device 950, a display 960, an interface 970, an audio module 980, a camera module 991, a power management module 995, a battery 996, an indicator 997, and a motor 998.

The processor 910 may drive an OS or an application to control a plurality of hardware or software components connected to the processor 910 and may process and compute a variety of data. The processor 910 may be implemented with a System on Chip (SoC), for example. The processor 910 may further include a graphic processing unit (GPU) and/or an image signal processor. The processor 910 may include at least a part (e.g., a cellular module 921) of components illustrated in FIG. 9. The processor 910 may load and process an instruction or data, which is received from at least one of other components (e.g., a nonvolatile memory), and may store a variety of data at a nonvolatile memory.

The communication module 920 includes a cellular module 921, a wireless-fidelity (Wi-Fi) module 923, a Bluetooth (BT) module 925, a GNSS module 927 (e.g., global positioning system (GPS) module, a Glonass module, Beidou module, or a Galileo module), a near field communication (NFC) module 928, and a radio frequency (RF) module 929.

The cellular module 921 may provide voice communication, video communication, a character service, an Internet service, etc., through a communication network. The cellular module 921 may perform discrimination and authentication of the electronic device within a communication network using the subscriber identification module 924 (e.g., a SIM card).

The cellular module 921 may perform at least a portion of functions that the processor 910 provides. The cellular module 921 may include a communication processor (CP).

Each of the Wi-Fi module 923, the BT module 925, the GNSS module 927, and the NFC module 928 may include a processor for processing data exchanged through a corresponding module. At least a portion (e.g., two or more components) of the cellular module 921, the Wi-Fi module 923, the BT module 925, the GNSS module 927, and the NFC module 928 may be included within an Integrated Circuit (IC) or an IC package.

The RF module 929 may transmit and receive a communication signal (e.g., an RF signal). The RF module 929 may include a transceiver, a power amplifier module (PAM), a frequency filter, a low noise amplifier (LNA), an antenna, etc. At least one of the cellular module 921, the Wi-Fi module 923, the BT module 925, the GNSS module 927, or the NFC module 928 may transmit and receive an RF signal through a separate RF module.

The subscriber identification module 924 may include a SIM card and may include unique identify information (e.g., integrated circuit card identifier (ICCID)) or subscriber information (e.g., integrated mobile subscriber identity (IMSI)).

The memory 930 includes an internal memory 932 and an external memory 934. For example, the internal memory 932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 934 may include a flash drive, compact flash (CF), secure digital (SD), micro secure digital (Micro-SD), mini secure digital (Mini-SD), extreme digital (xD), multimedia card (MMC), a memory stick, etc. The external memory 934 may be functionally and/or physically connected to the electronic device through various interfaces.

The sensor module 940 may measure a physical quantity or may detect an operation state of the electronic device. The sensor module 940 may convert the measured or detected information to an electric signal.

The sensor module 940 includes a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 9401, a temperature/humidity sensor 940J, an illuminance sensor 940K, and an UV sensor 940M. Additionally or alternatively, the sensor module 940 may include an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 940 may further include a control circuit for controlling at least one or more sensors included therein.

The electronic device may further include a processor, which is a part of the processor 910 or independent of the processor 910, and is configured to control the sensor module 940. The processor may control the sensor module 940 while the processor 910 remains at a sleep state.

The input device 950 includes a touch panel 952, a (digital) pen sensor 954, a key 956, and an ultrasonic input unit 958. The touch panel 952 may use at least one of capacitive, resistive, infrared and ultrasonic detecting methods. The touch panel 952 may further include a control circuit. The touch panel 952 may further include a tactile layer to provide a tactile reaction to a user.

The (digital) pen sensor 954 may be a part of a touch panel or may include an additional sheet for recognition.

The key 956 may include a physical button, an optical key, a keypad, or the like.

The ultrasonic input device 958 may detect (or sense) an ultrasonic signal, which is generated from an input device, through a microphone 988 and may determine data corresponding to the detected ultrasonic signal.

The display 960 includes a panel 962, a hologram device 964, and a projector 966. The panel 962 may be implemented as being flexible, transparent, or wearable. The panel 962 and the touch panel 952 may be integrated into a single module.

The hologram device 964 may display a stereoscopic image in a space using a light interference phenomenon.

The projector 966 may project light onto a screen so as to display an image. The screen may be arranged in the inside or the outside of the electronic device.

The display 960 may further include a control circuit for controlling the panel 962, the hologram device 964, or the projector 966.

The interface 970 includes an HDMI (high-definition multimedia interface) 972, a USB (universal serial bus) 974, an optical interface 976, and a D-sub (D-subminiature) 978. Additionally or alternatively, the interface 970 may include a mobile high definition link (MHL) interface, a SD card/multi-media card (MMC) interface, or an infrared data association (IrDA) standard interface.

The audio module 980 may convert a sound and an electric signal in dual directions. The audio module 980 may process, for example, sound information that is input or output through a speaker 982, a receiver 984, an earphone 986, or the microphone 988.

The camera module 991 for capturing still images and/or video may include at least one image sensor (e.g., a front sensor or a rear sensor), a lens, an image signal processor (ISP), and/or a flash (e.g., an LED or a xenon lamp).

The power management module 995 may manage power of the electronic device.

A power management integrated circuit (PMIC) a charger IC, or a battery gauge may be included in the power management module 995. The PMIC may have a wired charging method and/or a wireless charging method. The wireless charging method may include a magnetic resonance method, a magnetic induction method or an electromagnetic method and may further include an additional circuit, for example, a coil loop, a resonant circuit, or a rectifier, etc.

The battery gauge may measure a remaining capacity of the battery 996 and a voltage, current or temperature thereof while the battery is charged.

The battery 996 may include a rechargeable battery or a solar battery.

The indicator 997 may display a specific state of the electronic device or a portion thereof (e.g., the processor 910), such as a booting state, a message state, a charging state, etc.

The motor 998 may convert an electrical signal into a mechanical vibration and may generate the following effects: vibration, haptic, etc.

A processing device (e.g., a GPU) for supporting mobile TV may also be included in the electronic device. The processing device for supporting a mobile TV may process media data according to the standards of DMB, digital video broadcasting (DVB), MediaFlo™, etc.

Each of the above-mentioned elements of the electronic device may be configured with one or more components, and the names of the elements may be changed according to the type of the electronic device.

An electronic device according to an embodiment of the present disclosure may include at least one of the above-mentioned elements, and some elements may be omitted or other additional elements may be added. Further, some of the elements of the electronic device may be combined with each other so as to form one entity, so that the functions of the elements may be performed in the same manner as before the combination.

Figure 10:
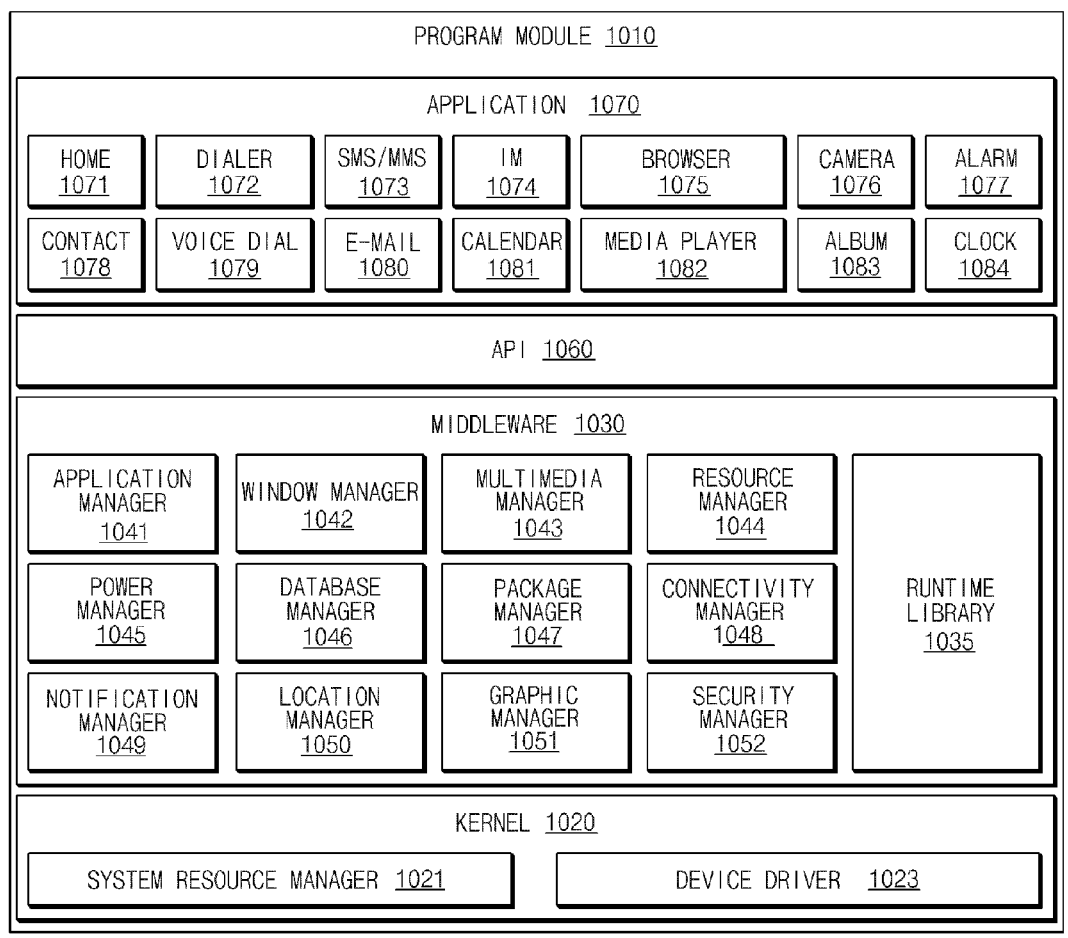
FIG. 10 illustrates a program module according to an embodiment of the present disclosure.

FIG. 10 illustrates a program module according to an embodiment of the present disclosure.

Referring to FIG. 10, a program module 1010 includes an OS to control resources associated with an electronic device, and/or diverse applications driven on the OS. The OS may be, for example, android®, iOS®, windows®, symbian®, tizen®, or bada®.

The program module 1010 includes a kernel 1020, a middleware 1030, an API 1060, and applications 1070. At least a part of the program module 1010 may be preloaded on an electronic device or may be downloadable from an external electronic device.

The kernel 1020 includes a system resource manager 1021 and a device driver 1023. The system resource manager 1021 may perform control, allocation, or retrieval of system resources. The system resource manager 1021 may include a process managing part, a memory managing part, or a file system managing part. The device driver 1023 may include a display driver, a camera driver, a Bluetooth driver, a common memory driver, an USB driver, a keypad driver, a Wi-Fi driver, an audio driver, or an inter-process communication (IPC) driver.

The middleware 1030 may provide a function which the applications 1070 need in common, or may provide diverse functions to the applications 1070 through the API 1060 to allow the applications 1070 to efficiently use limited system resources of the electronic device. The middleware 1030 includes a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035 may include a library module that is used by a compiler to add a new function through a programming language while the application 1070 is being executed. The runtime library 1035 may perform input/output management, memory management, or capacities about arithmetic functions.

The application manager 1041 may manage a life cycle of at least one the applications 1070.

The window manager 1042 may manage a GUI resource which is used in a screen.

The multimedia manager 1043 may identify a format for playing diverse media files, and may perform encoding or decoding of media files by using a codec suitable for the format.

The resource manager 1044 may manage resources such as a storage space, memory, or source code of at least one of the applications 1070.

The power manager 1045 may operate with a basic input/output system (BIOS) to manage a battery or power, and may provide power information for an operation of an electronic device.

The database manager 1046 may generate, search for, or modify a database that is to be used in at least one of the applications 1070.

The package manager 1047 may install or update an application that is distributed in the form of package file.

The connectivity manager 1048 may manage a wireless connection, such as Wi-Fi or Bluetooth.

The notification manager 1049 may display or notify an event, such as a message arrival or a proximity notification.

The location manager 1050 may manage location information of an electronic device.

The graphic manager 1051 may manage a graphic effect that is provided to a user, or manage a user interface relevant thereto.

The security manager 1052 may provide a general security function for system security or user authentication.

When an electronic includes a telephony function, the middleware 1030 may further include a telephony manager for managing a voice or video call function of the electronic device.

The middleware 1030 may include a middleware module that combines diverse functions of the above-described components. The middleware 1030 may provide a module specialized to each OS kind to provide differentiated functions. Additionally, the middleware 1030 may remove a part of the preexisting components, dynamically, or may add a new component thereto.

The API 1060 may be a set of programming functions and may be provided with a configuration, which varies depending on an OS. For example, when the OS is android® or iOS®, it may be permissible to provide one API set per platform, and when the OS is the tizen®, it may be permissible to provide two or more API sets per platform.

The applications 1070 include a home application 1071, a dialer application 1072, an SMS/MMS application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, and an application timepiece 1084. Additionally or alternatively, the applications 1070 may include an application for offering health care (e.g., measuring an exercise quantity or blood sugar level) or environment information (e.g., barometric pressure, humidity, or temperature).

The applications 1070 may include an information exchanging application that supports information exchange between the electronic device and an external electronic device. The information exchanging application may include a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device. Additionally, the information exchanging application may receive notification information from an external electronic device and provide the notification information to a user.

The device management application may manage (e.g., install, delete, or update) at least one function (e.g., turn-on/turn-off of an external electronic device itself (or a part of components) or adjustment of brightness (or resolution) of a display) of the external electronic device that communicates with the electronic device, an application running in the external electronic device, or a service (e.g., a call service, a message service, etc.) provided from the external electronic device.

The applications 1070 may include an application (e.g., a health care application of a mobile medical device, or the like) which is assigned in accordance with an attribute of the external electronic device (e.g., an attribute of a mobile medical device as a kind of electronic device).

The applications 1070 may include an application received from an external electronic device.

The applications 1070 may include a preloaded application or a third party application that is downloadable from a server.

The component titles of the program module 1010 may be modifiable depending on the type of OS being used.

At least a portion of the program module 1010 may be implemented by software, firmware, hardware, or a combination of two or more thereof. At least a portion of the program module 1010 may be implemented (e.g., executed), for example, by a processor. At least a portion of the program module 1010 may include modules, programs, routines, sets of instructions, or processes, etc., for performing one or more functions.

Herein, the term "module" may represent a unit including one or more combinations of hardware, software and firmware. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be implemented by instructions stored in a computer-readable storage media in the form of a program module. The instruction, when executed by one or more processors (e.g., the processor 820 illustrated in FIG. 8), may cause the one or more processors to perform a function corresponding to the instruction. For example, the computer-readable storage media may be the memory 830 illustrated in FIG. 8.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

According to various embodiments of the present disclosure, a computer-readable recording medium may store program to perform an operation which recognizes whether an electronic device is at a specific state, an operation which recognizes an occurrence of a specific event in the specific state, an operation which outputs a color associated with the event through a portion of the display when the event occurs, an operation which determines an occurrence of a user input while outputting the color, and an operation which performs a function associated with the user input when the user input occurs.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

A method for performing a function and an electronic device according to various embodiments of the present disclosure may allow a user to recognize a type of event based on a color notification output through a portion of a display, when the user is not able to see or is difficult to see all of the display.

A method for performing a function and an electronic device according to various embodiments of the present disclosure may allow a user to recognize a type of event based on a color notification output through a portion of a display and may perform a function corresponding to the event in response to a simple sensor input, a simple button input, etc.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method for performing a function in an electronic device including a display, the method comprising:
   recognizing that the electronic device is at a first state, the first state including that the electronic device is in an overturned state or that a predetermined amount of the display is covered;
   detecting a specific event in the first state;
   outputting a color notification associated with the detected specific event through at least a portion of the display, the portion of the display wrapping around a side edge of the electronic device;
   receiving a specific user input corresponding to the color notification, while outputting the color notification; and
   performing a function associated with the received specific user input.

2. The method of claim 1, wherein recognizing the first state comprises recognizing that the electronic device is in the overturned state using a sensor module.

3. The method of claim 2, wherein the sensor module includes at least one of a proximity sensor, an acceleration sensor, and a geomagnetic sensor.

4. The method of claim 1, wherein recognizing the first state comprises determining that the predetermined amount of the display is covered using a sensor module.

5. The method of claim 1, wherein outputting the color notification associated with the detected specific event comprises:
   identifying a type of application associated with the detected specific event;
   identifying a method for outputting the color notification associated with the detected specific event, based on the type of application associated with the detected specific event; and
   outputting the color notification based on the identified method for outputting the color notification.

6. The method of claim 1, wherein outputting the color notification associated with the detected specific event comprises outputting different color notifications based on respective types of events occurring in a same application.

7. The method of claim 1, wherein outputting the color notification associated with the detected specific event comprises changing a method for outputting the color notification according to time.

8. The method of claim 1, wherein receiving the specific user input comprises receiving the specific user input through at least one of a sensor recognition input, a camera image processing input, a button input, and a touch input.

9. The method of claim 8, wherein the sensor recognition input comprises at least one of a heart rate monitor (HRM) sensor, a fingerprint sensor, a pressure sensor, an illuminance sensor, and a motion sensor.

10. The method of claim 1, wherein outputting the color notification associated with the detected specific event comprises:
    dividing the at least the portion of the display into a plurality of sections; and
    outputting the color notification through at least one of the plurality of sections based on a type of the detected specific event.

11. The method of claim 1, wherein performing the function associated with the specific user input comprises determining the function to be performed based on a type of the specific user input.

12. The method of claim 11, wherein the type of the specific user input includes at least one of a touch direction, a touch duration, a motion direction of the user input, and a tilt change of the electronic device.

13. An electronic device, comprising:
    a display; and
    a processor configured to:
      detect that the electronic device is in a first state, the first state including that the electronic device is in an overturned state or that a predetermined amount of the display is covered,
      detect an event in the first state,
      output a color notification associated with the detected event through a portion of the display that wraps around a side edge of the electronic device,
      receive a user input corresponding to the color notification, while outputting the color notification, and
      perform a function associated with the received user input.

14. The electronic device of claim 13, wherein the processor is further configured to output the color notification in a predetermined shape associated with the detected event through the portion of the display.

15. The electronic device of claim 14, wherein the predetermined shape comprises one of a wave shape and a rectangular shape.

16. The electronic device of claim 13, further comprising a sensor for sensing that the electronic device is in the overturned state or that the predetermined amount of the display is covered.

17. The electronic device of claim 13, wherein the processor is further configured to:
    identify a type of application associated with the detected specific event;
    identify a method for outputting the color notification associated with the detected specific event, based on the type of application associated with the detected specific event; and
    output the color notification based on the identified method for outputting the color notification.

18. The electronic device of claim 13, wherein the specific user input comprises at least one of:
- a sensor recognition input;
- a camera image processing input;
- a button input; and
- a touch input.

19. The electronic device of claim 13, wherein the display comprises a plurality of sections, and
- wherein the processor is further configured to output the color notification through at least one of the plurality of sections based on a type of the specific event.

20. The electronic device of claim 13, wherein the processor is further configured to output different color notifications based on respective types of events occurring in a same application.

\* \* \* \* \*